United States Patent
Swiderski et al.

(10) Patent No.: US 11,533,788 B2
(45) Date of Patent: Dec. 20, 2022

(54) SYSTEM AND METHOD FOR INDUCTION SHRINK FITTING

(71) Applicant: PRATT & WHITNEY CANADA CORP., Longueuil (CA)

(72) Inventors: Joseph Swiderski, Dundas (CA); Guy Beaulieu, Prévost (CA); Parham Zabeti, Toronto (CA); Pierre-Luc Lachance, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/321,583

(22) Filed: May 17, 2021

(65) Prior Publication Data

US 2022/0369429 A1 Nov. 17, 2022

(51) Int. Cl.
| | | |
|---|---|---|
| H05B 6/06 | (2006.01) |
| F16B 4/00 | (2006.01) |
| G05D 23/19 | (2006.01) |
| G06K 19/06 | (2006.01) |
| B23P 11/02 | (2006.01) |
| G06K 7/14 | (2006.01) |
| G05D 23/22 | (2006.01) |

(52) U.S. Cl.
CPC ............ H05B 6/06 (2013.01); B23P 11/025 (2013.01); F16B 4/006 (2013.01); G05D 23/1951 (2013.01); G05D 23/22 (2013.01); G06K 7/1417 (2013.01); G06K 19/06037 (2013.01)

(58) Field of Classification Search
CPC .......... H05B 6/06; B23P 11/025; F16B 4/006; G05D 23/1951; G05D 23/22; G06K 7/1417; G06K 19/09037
See application file for complete search history.

(56) References Cited

U.S. PATENT DOCUMENTS

| | | | |
|---|---|---|---|
| 8,038,931 B1 | 10/2011 | Thomas et al. | |
| 8,058,591 B2 | 11/2011 | Demichael | |
| 10,920,592 B2 | 2/2021 | Friedman et al. | |
| 2015/0359263 A1* | 12/2015 | Bellinger | A24F 40/57 392/394 |
| 2016/0014850 A1 | 1/2016 | Verhagen et al. | |

FOREIGN PATENT DOCUMENTS

| | | |
|---|---|---|
| JP | 201104312 | 3/2011 |
| WO | 2006132935 | 12/2006 |
| WO | 2019074784 | 4/2019 |

OTHER PUBLICATIONS

A. Ivanov, V. Bukanin, A. Zenkov, V. Vologdin and V. Vologdin, "Cyber Physical Systems Integration for Induction Heating Technologies," 2020 9th Mediterranean Conference on Embedded Computing (MECO), 2020, pp. 1-4, doi: 10.1109/MECO49872.2020.9134256. (Year: 2020).*

* cited by examiner

Primary Examiner — Matthew Mikels
(74) Attorney, Agent, or Firm — Norton Rose Fulbright Canada LLP

(57) ABSTRACT

An induction heating system can be adapted for shrink fitting a plurality of different assemblies. A plurality of tooling units associated to respective ones of the assemblies, each one having an appropriately configured induction coil and holder, can be provided. A computer can be used to control the delivery of electrical power to the induction coil in accordance with a heating recipe, and can be provided with an input device for inputting an assembly identifier allowing the computer to operate the control based on the right heating recipe.

17 Claims, 9 Drawing Sheets

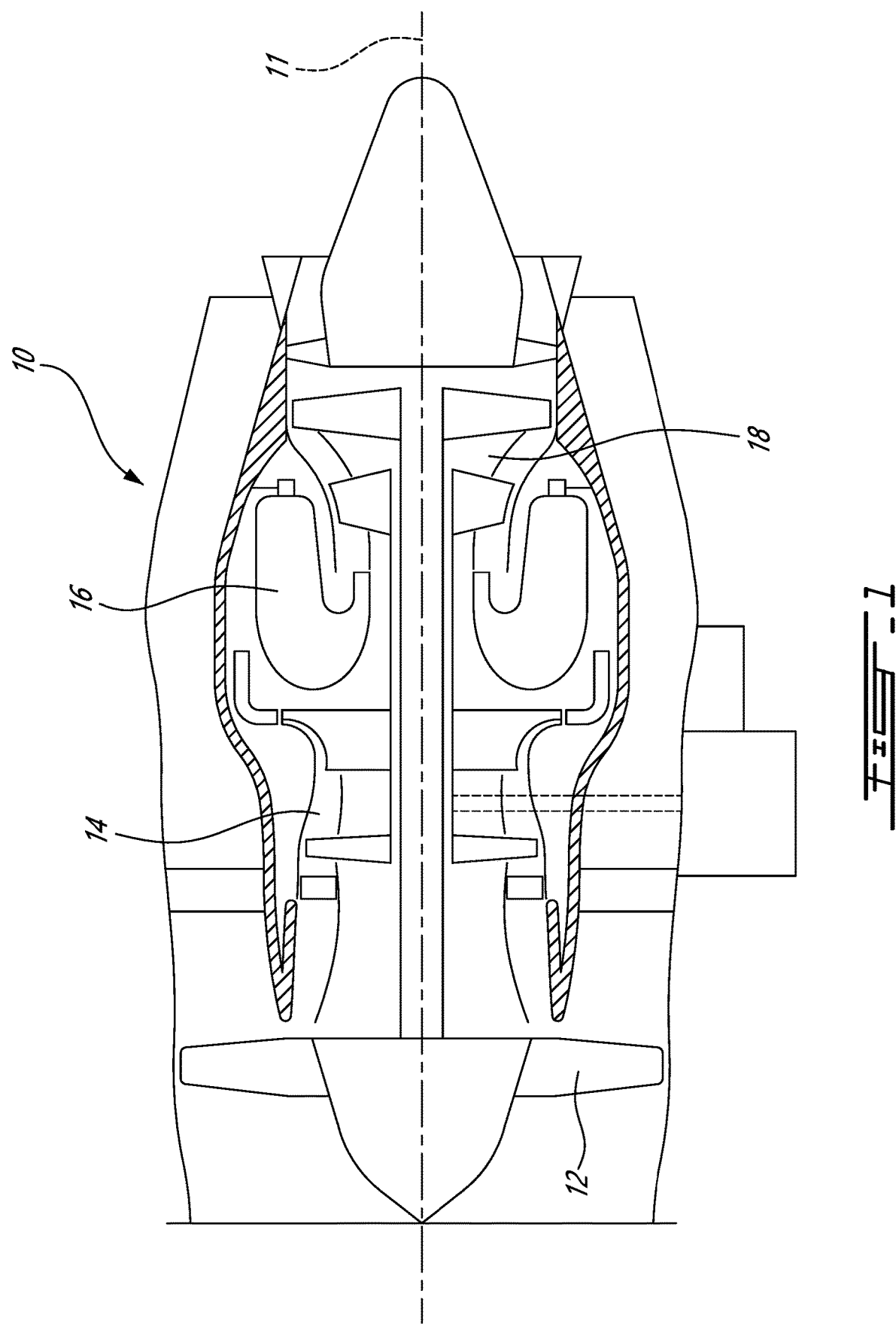

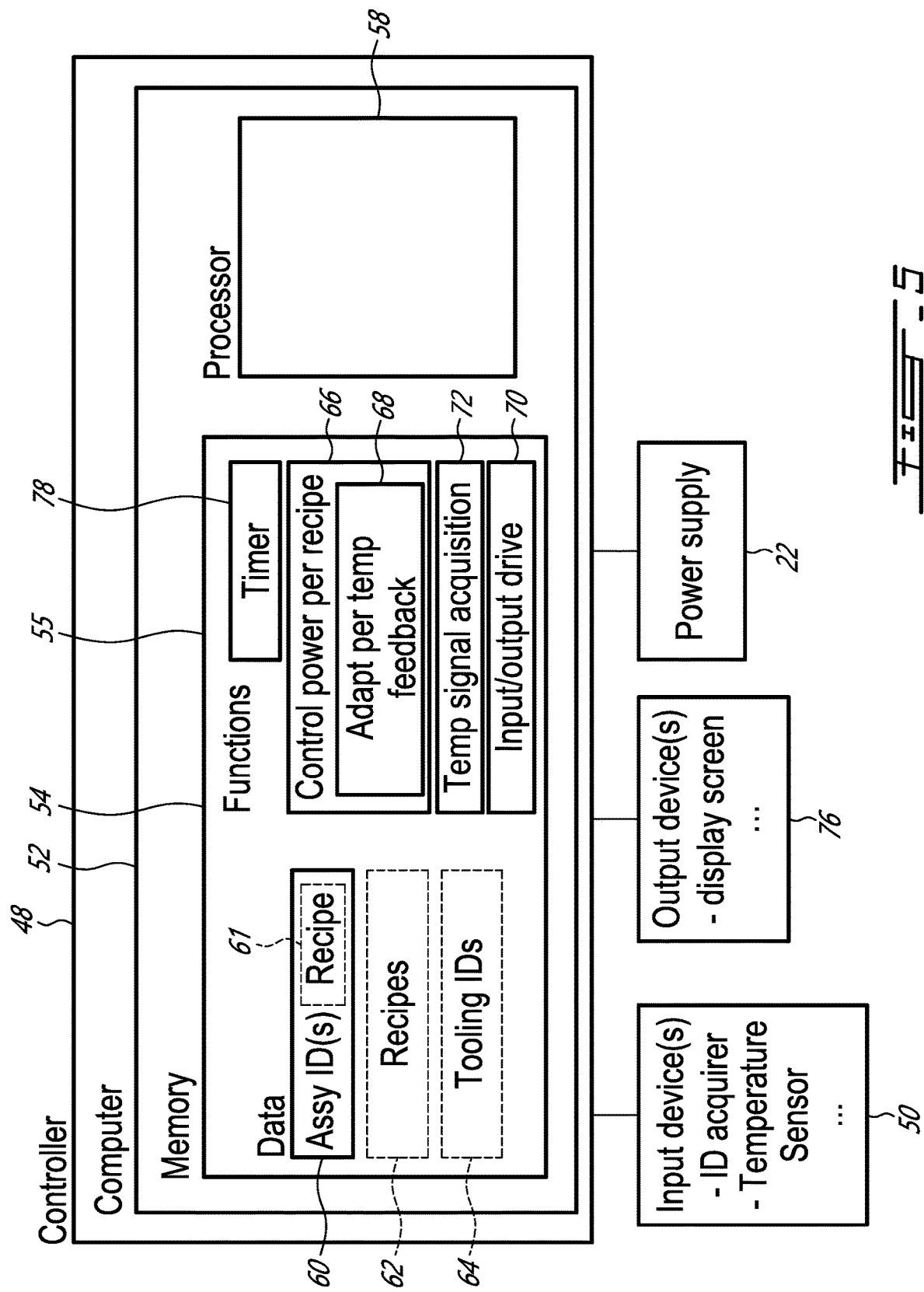

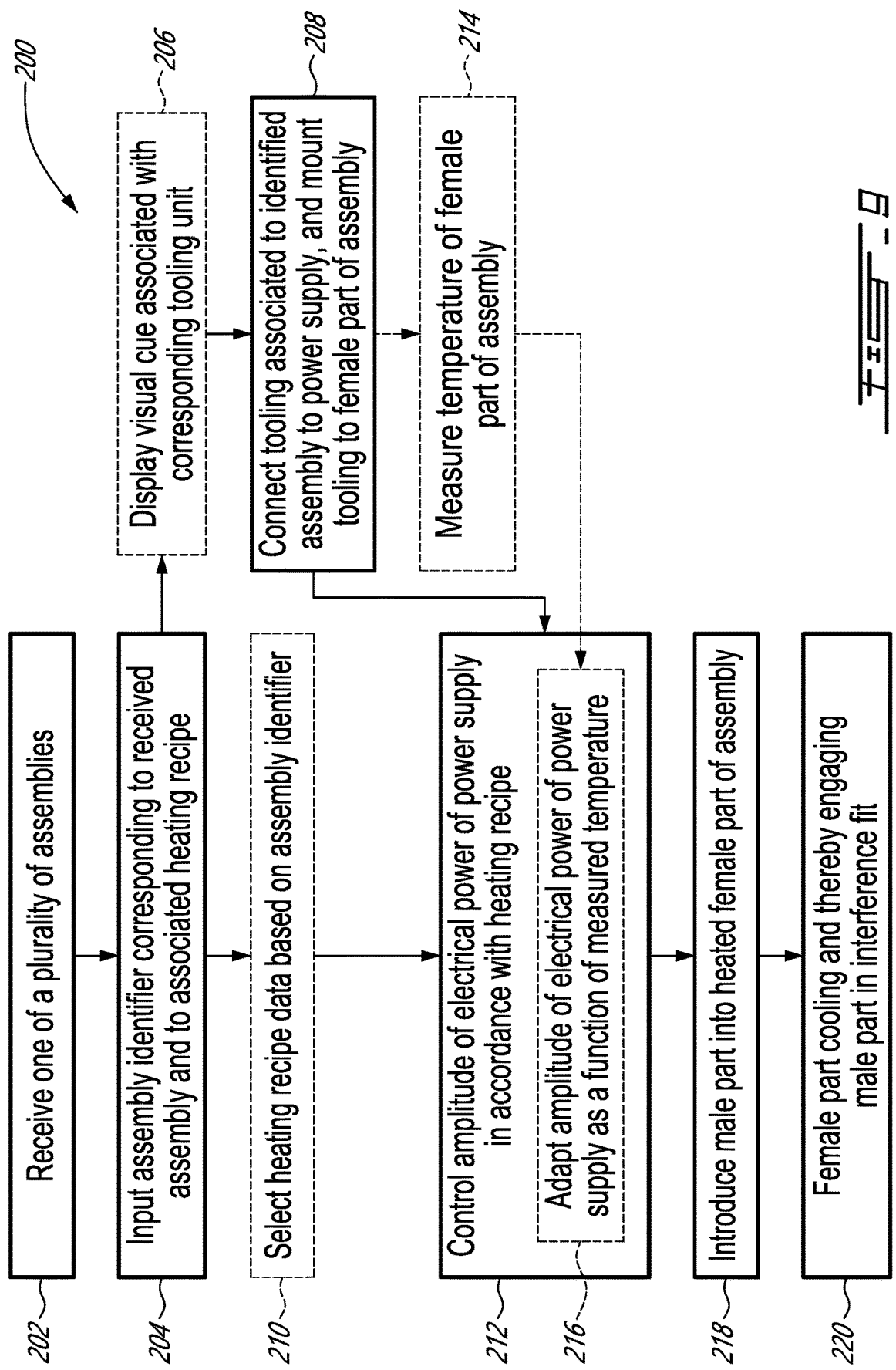

SYSTEM AND METHOD FOR INDUCTION SHRINK FITTING

TECHNICAL FIELD

The application relates generally to aircraft engines and, more particularly, to a system and method for shrink fitting assemblies thereof.

BACKGROUND OF THE ART

Shrink fitting can be used to assemble a male part to a female part of an aircraft engine assembly. More specifically, shrink fitting can involve heating the female part to harness the phenomenon of thermal growth, introduce the male part into the female part while the female part is in the state of thermal growth, the subsequent cooling of the female part resulting in shrinking into an interference fit with the male part.

While known shrink fitting techniques were satisfactory to a certain degree, there remained several areas for potential improvement. In particular, it can be desired for shrink fitting techniques to be practical, highly predictable, avoid damaging the heated part, and/or otherwise allow to reduce the overall manufacturing costs of the aircraft engine. In particular, the female part of some assemblies may be sensitive to maximum temperature and/or ramping rate of the increase in temperature, which may impose challenges in optimizing the production rate.

SUMMARY

In one aspect, there is provided an induction heating system for shrink fitting a plurality of different assemblies, each assembly having a corresponding female part and male part configured for interference fitting within the female part, the system comprising: a plurality of tooling units associated to respective ones of the assemblies, each tooling unit including an induction coil configured for induction heating the corresponding female part when in a heating position and supplied with electrical power, and a holder supporting the induction coil, the holder configured for engagement with the corresponding female part in a manner to hold the induction coil in the heating position when engaged; a power supply configured for generating the electrical power; power cables configured for selectively connecting and disconnecting the power supply to any one of the tooling units; and a computer having a processor and non-transitory memory readable by the processor, an input device configured for inputting an assembly identifier associated to a respective one of the assemblies into the non-transitory memory, each assembly identifier associating the corresponding assembly to a corresponding heating recipe, the heating recipe including a heating rate setpoint, and a function, stored in the non-transitory memory and executable by the processor, to control an amplitude of the electrical power in accordance with the heating recipe.

In another aspect, there is provided a method of shrink fitting a female part to a male part into one of a plurality of assemblies, the system comprising: selecting a corresponding one of a plurality of tooling units associated to said assembly, the tooling unit including an induction coil supported by a holder; mounting said corresponding tooling unit to the female part of the assembly in a manner for the holder to hold the induction coil in an induction heating position relative to the female part; connecting the tooling unit to a power supply; inputting an assembly identifier into a computer configured for controlling the power supply; using the computer, controlling an amplitude of the electrical power delivered to the induction coil in the induction heating position by the power supply in accordance with a heating recipe, the heating recipe including a heating rate setpoint, and being based on the assembly identifier; fitting the male part into the female part; and the female part cooling and shrinking into an interference fit with the male part.

In a further aspect, there is provided a computer program product configured to, when stored in a non-transitory memory and executed by a processor, receive an assembly identifier associated to one of a plurality of assemblies, each assembly having a female part and a male part, and control an amplitude of electrical power delivered to an induction coil located in a heating position relative to the corresponding female part, said controlling an amplitude being in accordance with a heating recipe, the heating recipe based on the assembly identifier and including a heating rate setpoint.

DESCRIPTION OF THE DRAWINGS

Reference is now made to the accompanying figures in which:

FIG. 1 is a schematic cross-sectional view of a gas turbine engine;

FIG. 5 is a diagram of an example controller;

FIG. 9 is a flow chart of an example method of shrink fitting parts together.

DETAILED DESCRIPTION

Figure 2B:
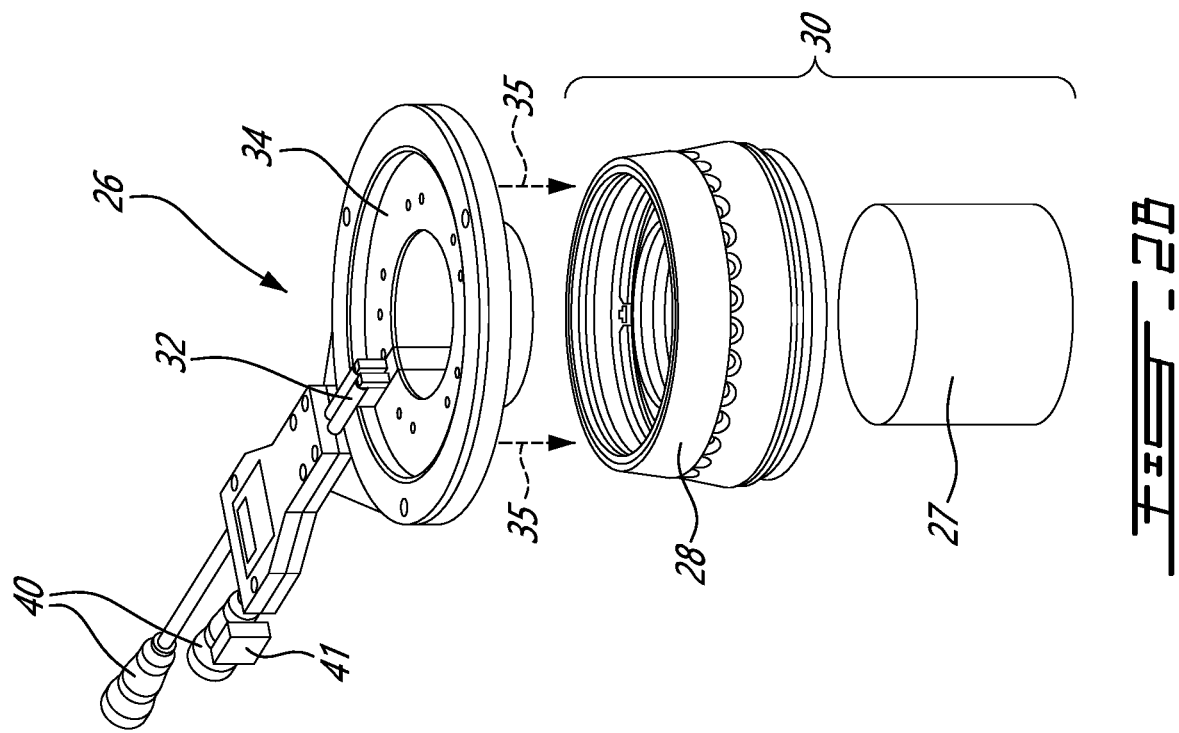
FIG. 2B is a perspective view of an example tooling unit to be used on a example assembly.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

Various types of gas turbine engines are commonly used as aircraft engines. Other types of engines, such as piston engines, hybrid engines, etc. can also be used as aircraft engines.

Aircraft engines typically involve the assembly of a wide variety of parts. The elected means by which parts are to be assembled to one another can vary depending on the nature of the part, on its temperature variations and internal stress to be expected within the operating envelope of the engine, expected fabrication costs, available space, etc. It was found that at least in some embodiments, shrink fitting following an induction heating process was found suitable to assemble a male part 27 to a female part 28 of an aircraft engine assembly 30.

Figure 2A:
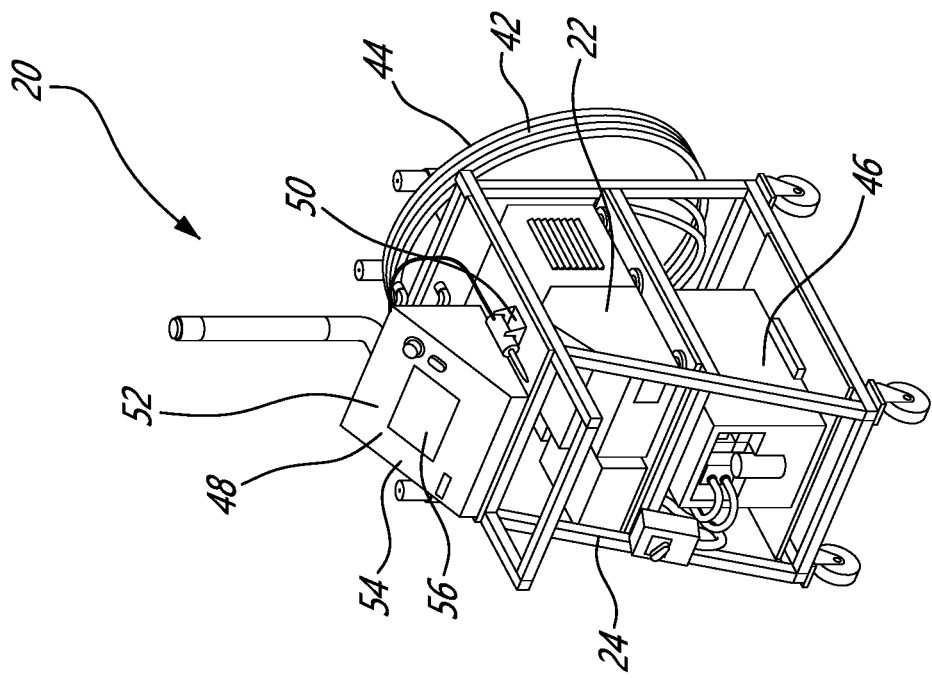
FIG. 2A is a perspective view of an example induction heating system.

More specifically, as represented in FIG. 2A-2B, an example industrial production setting can be specifically adapted to allow the shrink fitting assembly of a plurality of different aircraft engine assemblies at a desirable production rate with a given induction heating station. The induction heating station can be equipped with an induction heating system 20 which can have a power supply 22 supported by a frame 24, as perhaps best seen in FIG. 2A. A plurality of tooling units 26 can be provided, with each tooling unit 26 being adapted specifically to engage the female part 28 of a corresponding one of the plurality of different assemblies 30. A first example tooling 26 unit is presented in FIG. 2B, and other example tooling units 26 are presented in FIGS. 3A and 4A. In an alternate embodiment, the induction heating equipment can be carried to the engine assembly location.

Figure 3B:
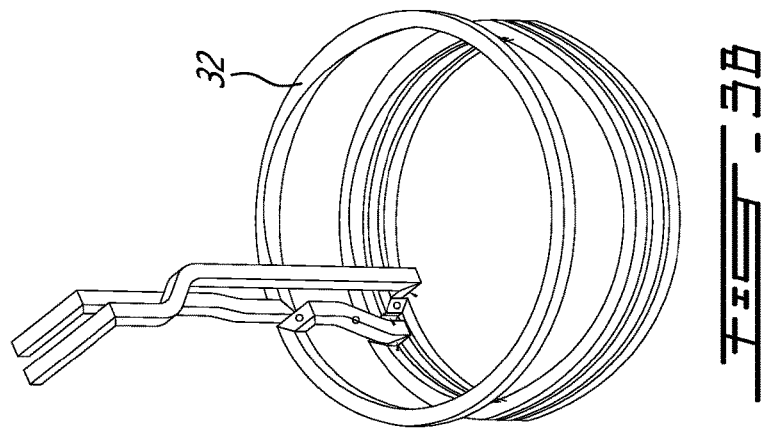
FIG. 3B is a perspective view of the induction coil found in the example tooling unit of FIG. 3A.
Figure 3A:
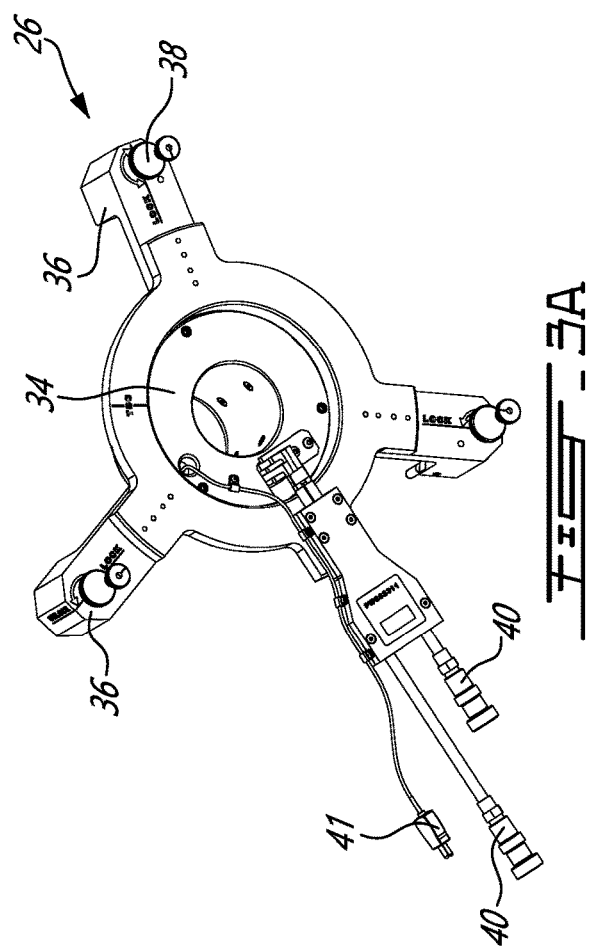
FIG. 3A is a perspective view of another example of a tooling unit.
Figure 4C:
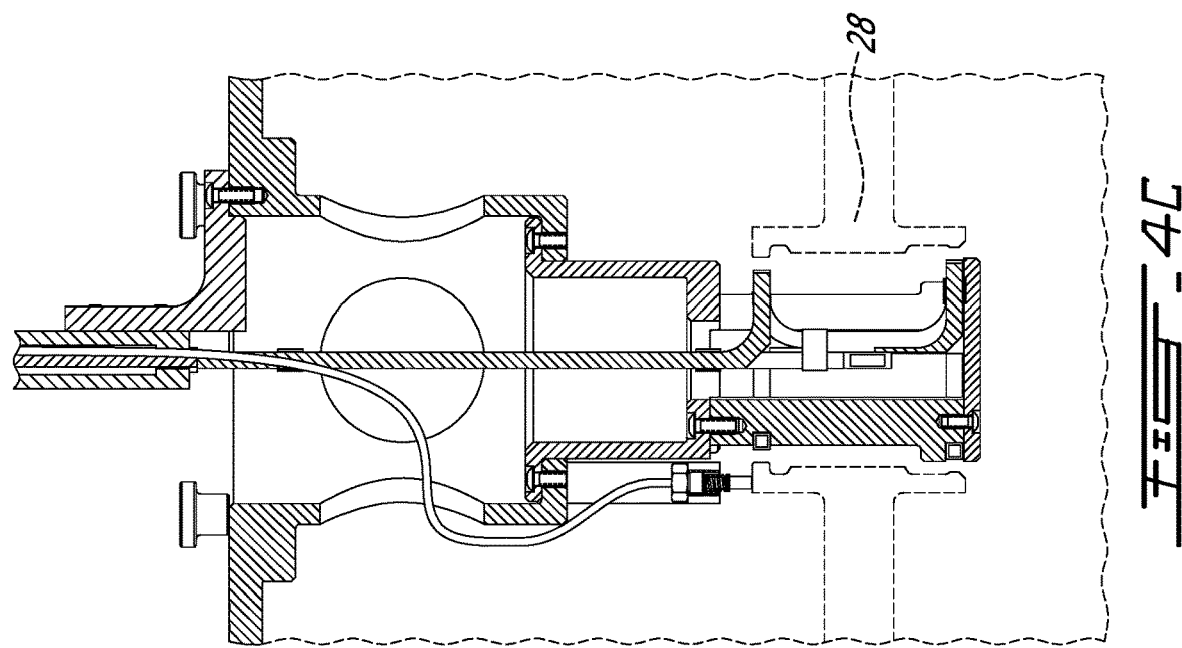
FIG. 4C is a partial cross-sectional view of the example tooling unit of FIG. 4A being used on an example female part.
Figure 4B:
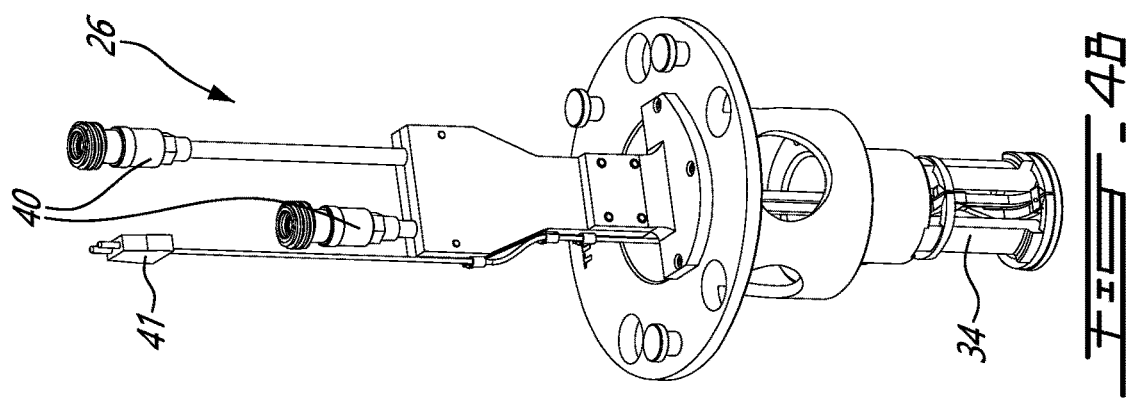
FIG. 4B is a perspective view of the induction coil found in the example tooling unit of FIG. 4A.
Figure 4A:
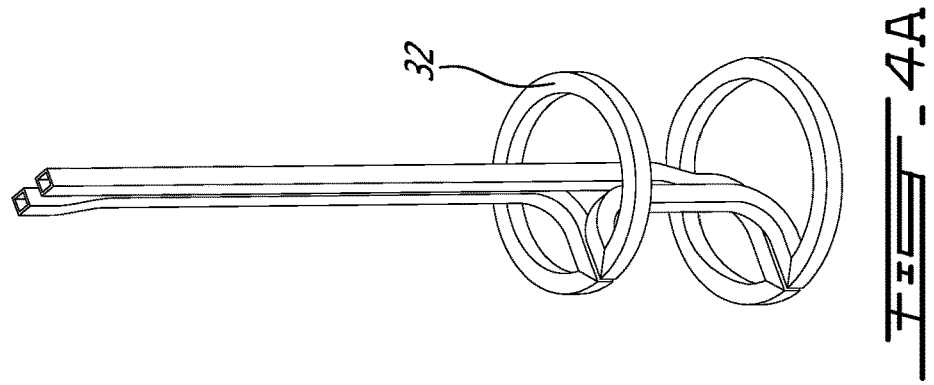
FIG. 4A is a perspective view of yet another example of a tooling unit.

Each tooling unit 26 includes at least one induction coil 32 which is specifically adapted for efficiently heating the female part 28 of the assembly 30 it is adapted for when it is positioned in a predetermined relative position—that is, relative position to the assembly. The predetermined relative position can be referred to as the induction heating position herein, and will be understood to involve a proximity between the induction coil 32 and the corresponding portions of the female parts 28 to be heated, in a manner for an electromagnetic field emitted by the induction coil 32 to have a suitable intensity which engages and penetrates the corresponding portion of the female part 28 during operation. An example positioning of the tooling unit 26 is perhaps best illustrated by the engagement arrows 35 in FIG. 2B. The induction coil of the tooling unit of FIG. 3A is presented alone in FIG. 3B, and the induction coil of the tooling unit of FIG. 4A is presented alone in FIG. 4B, to provide illustrative examples.

Figure 3C:
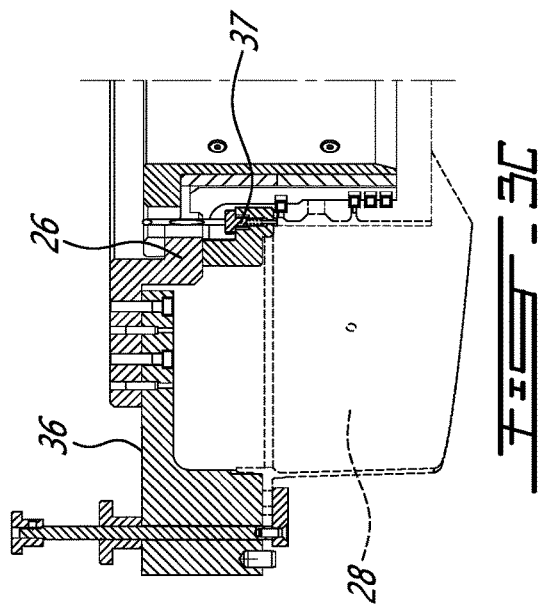
FIG. 3C is a partial cross-sectional view of the example tooling unit of FIG. 3A being used on an example female part.

Each the tooling unit 26 also includes a holder 34 which is generally adapted to hold the induction coil 32 in the heating position relative to the corresponding female part 28 during the induction heating operation. To this end, the induction coil 32 can be secured to the holder 34. Moreover, the holder 34 can be provided with fastening means, such as fasteners 38, clamps 36 and/or the like for instance, which are specifically designed to be selectively firmly engaged with, and conveniently disengaged from, the female part 28. To this end, fasteners 38 and/or clamps 36 can be integrated to the holder 34 and configured for conveniently engaging and disengaging the corresponding female part. FIG. 3C presents an example of a tooling unit 26 which is firmly secured to the corresponding female part 28 by way of clamps 36 and/or fasteners 38. In other embodiments, the holder can be so configured so as to be stably held in place during the induction heating operation simply by the action of gravity. In the example of FIG. 3A-3C, the tooling unit 26 includes a thermocouple 37. In an alternate embodiment, the tooling unit can be simply held stably engaged with the female part by gravity during the induction heating operation.

Connectors 40 can be integrated to two opposite ends of the induction coil 32, and adapted to matingly engage corresponding connectors provided at ends of the power cables 42. As we will see further below, the tooling unit 26 can further be provided with one or more temperature sensors which can also be held in a fixed position relative to the induction coil 32 by the holder 34, and therefore held in a given position relative to the female part 28 when in the heating position, for the purpose of sensing the instantaneous temperature of a predetermined area of the female part 28, for instance. The temperature signal can be transmitted through an additional connector 41 and engage with a corresponding connector which may extend parallel to (or otherwise be brought to the tooling unit concurrently with) the power cables 42. If one or more temperature sensors are used, corresponding wired connectors can be provided for instance, or a wireless transmission unit can be integrated into the tooling with replaceable batteries. Various forms of temperature sensors can be used and the choice can be left to the designer of a specific embodiment. Thermocouples, infrared sensors, and thermistor are examples of potential temperature sensors.

The induction heating system 20 can further be provided with power cables 42 bearing connectors mating with the tooling unit 26 connectors 40. Snap-fitting connectors can be used for convenience, if desired. In some embodiments, the amount of electrical power to be conveyed to the induction coil 32 via the cables 42 can be high enough to warrant using some form of cooling system for the cables. Water cooling can be used in some embodiments, for instance, in which case the cables have hoses 44 surrounding the electrical conductors and along which cooling water circulation can be sustained during the induction heating process. To this end, the induction heating system 20 can have a water circulation subsystem 46, for instance. The electrical conductors can be in a litz wire configuration, for instance.

Referring to FIG. 2A, the induction heating system 20 can be provided with a controller 48 configured and adapted to automatically, or semi-automatically control the amplitude of the electrical power conveyed to the induction coil 32 during operation, based on instructions which will be referred to herein as a heating recipe. Since different ones of the assemblies 30 can have different heating recipes, each associated to the particularities of the corresponding female part 28, and with a view of optimizing the speed of the heating process, it can be convenient to provide some means for storing the heating recipe into a memory in a manner that it can be executed upon by a processor, and for this reason, it can be convenient for the controller 48 to be embodied as some form of computer 52. As we will see, a programmable logic controller or a progressive-integral-derivative controller can be used in some embodiments, but there are many ways to embody such a computer 52, and in some case it may be convenient for the computer 52 to be embodied as a smartphone or laptop, for instance. The controller 48 can include one or more input device(s) 50, such as a keypad or a code scanner for instance, which can be used to input the assembly identifier (Assy ID) which ultimately allows the computer 52 and/or the controller 48 to know which heating recipe it is to use when operating on a given assembly 30 and/or female part 28. Some examples of how this can be achieved in different embodiments will be presented below.

The controller 48 can be embodied in various forms in different embodiments, and this topic will be explored to a certain extent.

In perhaps a quite simple embodiment, the computer 52 can be a programmable logic controller (PLC), and the input device 50 can be a hand-held scanner. In accordance with this embodiment, each assembly 30 can be provided with a corresponding code, which can be a scannable code such as a barcode or a 2D code for instance, and the latter can be scanned by the hand-held scanner as a first part of the process. In such an embodiment, the heating recipe can be included as data acquired from the 2D code itself, for instance, and stored temporarily into the memory 54 of the PLC. In such an embodiment, the heating recipe can be considered to be one and the same as the assembly identifier, for instance, that is to say that the assembly identifier can contain no other data than the heating recipe, or additional data to the heating recipe, such as a tooling identifier, for instance.

In a perhaps more elaborate embodiment, the computer 52 can be a laptop personal computer, tablet, or smartphone, and the input device 50 can be a keypad, touchscreen, mouse, etc. A number of recipes corresponding to different assemblies 30 can be stored in a somewhat permanent manner (i.e. until replaced or deleted), in the memory 54 of the computer 52, together with corresponding assembly identifiers. When a next set of parts reaches the induction heating station 20, a human operator can determine an identifier of the set of parts, input that identifier via the keypad, and the computer 52 can then select the heating recipe associated to the corresponding assembly 30/set of parts based on the assembly identifier, and thereafter control the power supply based on that heating recipe, to name another example. Many different variations are also possible.

In some embodiments, it can be preferred for the induction heating system 20 to be somewhat further automated and to direct the operator to the correct tooling unit 26. This can be achieved by displaying an image of the tooling unit 26 to be used in association with the corresponding part identifier on a display screen 56, for instance, or simply displaying a tooling identifier, such as a tooling number, on a display screen 56, facilitating the operator's selection of the correct tooling unit 26, which may be particularly advantageous in situations where a relatively large number of tooling units 26 are associated to a single induction heating system 20, for instance. In such embodiments, data pertaining to the tooling unit 26 can either be already stored in the memory 54 of the computer 52, and selected based on the assembly identifier for instance, or can be integrated to the assembly identifier itself, similarly to how the details of the heating recipe can be provided differently depending on the embodiment. The computer can read the heating parameter values directly in the 2D code, and replace any previously stored heating parameter values by the newly read heating parameter values in the memory of the computer.

FIG. 5 presents an example of a controller 48 which includes a computer 52, the computer 52 has a non-transitory memory 55 and a processor 58, the non-transitory memory 55 can be used to store data such as the assembly identifier (Assy ID) 60, with or without an embedded recipe 61, recipes 62, tooling IDs 64, etc. and programs configured to perform functions such as controlling the electrical power as per the recipe 66, adapting the power 68 as per temperature signal acquisition 72, managing inputs and outputs 70, when executed upon by the processor 58. The controller 48 can have a number of input devices 50, such as a keypad or scanner used to acquire the assembly identifier 60 associated to a given assembly 30, and one or more temperature sensors for instance. The controller 48 is connected to the power supply 22 in a manner to control it, and can also have one or more output device(s) 76 such as a display screen.

Once the correct tooling unit 26 has been selected, connected to the power supply 22 via the power cables 42, and suitably mounted to the female part 28, the induction heating system 20 can be triggered into operation to proceed with the heating of the female part 28 in accordance with the corresponding induction heating recipe.

The nature of the induction heating recipe can vary from one embodiment to another. In perhaps the simplest imaginable scenario, the heating recipe can consist solely of a single heating rate setpoint considered to be the maximum heating rate setpoint suitable for that part. The heating rate setpoint can be expressed an electrical power value in some embodiments. In such embodiments, the controller can simply set the electrical power output of the power supply using the heating rate setpoint expressed in the heating recipe of the associated part. Such a simplistic approach may not be suitable for all embodiments. Indeed, several variables may influence the "real" power output for a given power output setting of the induction heating system. Such variables can include ambient temperature of the environment, the initial temperature of the female part, the system efficiency, the system's component deterioration over time, which can cause an increase in electrical resistance of the system, cables, connectors and/or induction heating coil, and even the power grid's electrical input into the system. To this end, it can be preferred to use some form of monitoring system to gauge the system's reaction to a given electrical power setting, in real time. This can be achieved by using a control loop based on feedback received from one or more sensors.

In one relatively simple example, an electrical power output sensor can be used to gauge, in real time, the actual electrical power output associated to a given electrical power setting, and a control loop can be used to adjust the electrical power setting based on the feedback from the sensor, to achieve an "actual" electrical power output in accordance with the heating recipe.

In other embodiments, it may be considered even more efficient to use a control loop which is based on the actual temperature of the female part 28 being heated, or a dummy metal part being heated as part of the system on which a reference temperature is measured, in which cases the heating rate setpoint can be expressed in the form of a rate of increase in temperature, for instance. In some embodiments, this can suitably be achieved by incorporating one (or more) temperature sensor into the tooling unit 26, and using some form of feedback loop, such as a proportional-integral-derivative (PID) control based on both the recipe and the feedback received from the sensor(s). More specifically, directions of the recipe can then be provided in the form of values which can be sensed on the part, such as a heating rate setpoint in units of temperature/time (e.g. ° C./s or ° F./s), for instance, and the feedback loop can adapt the power setting in real time based on the temperature sensed by the sensor(s).

The heating recipe can further include a target temperature value, for instance which can be the temperature which is ultimately targeted by the heating process. Independently of the nature of the heating rate setpoint (e.g. electrical power-based or temperature increase rate-based), a target temperature value can be controlled against a temperature signal stemming from a sensor configured to sense the temperature signal from the female part. The computer 52 can be provided with a function which interrupts the electrical power supply based on the target temperature value stated in the recipe and the temperature as sensed in real time. In a somewhat simplistic case, the function can interrupt the electrical power supply immediately upon detecting that the temperature reaches the target temperature value. In a somewhat more elaborate scenario, the function can interrupt the electrical power supply slightly before reaching the target temperature value, taking into consideration factors such as the rate or delay in temperature increase, for instance, or progressively lower the electrical power supply as the sensed temperature gets closer to the target temperature value.

The heating recipes can be more or less complex depending on the embodiment. In some embodiments, for instance, instead of having a single heating rate setpoint which is to remain fixed across the entire induction heating process, the recipe can include a plurality of different steps, or segments, which can be separated by units of time or by units of actual temperature for instance, and each segment can have a different, corresponding heating rate setpoint. Ultimately, the recipe can even specify a continuously varying heating rate setpoint over the entire heating envelope, for instance.

Figure 6:
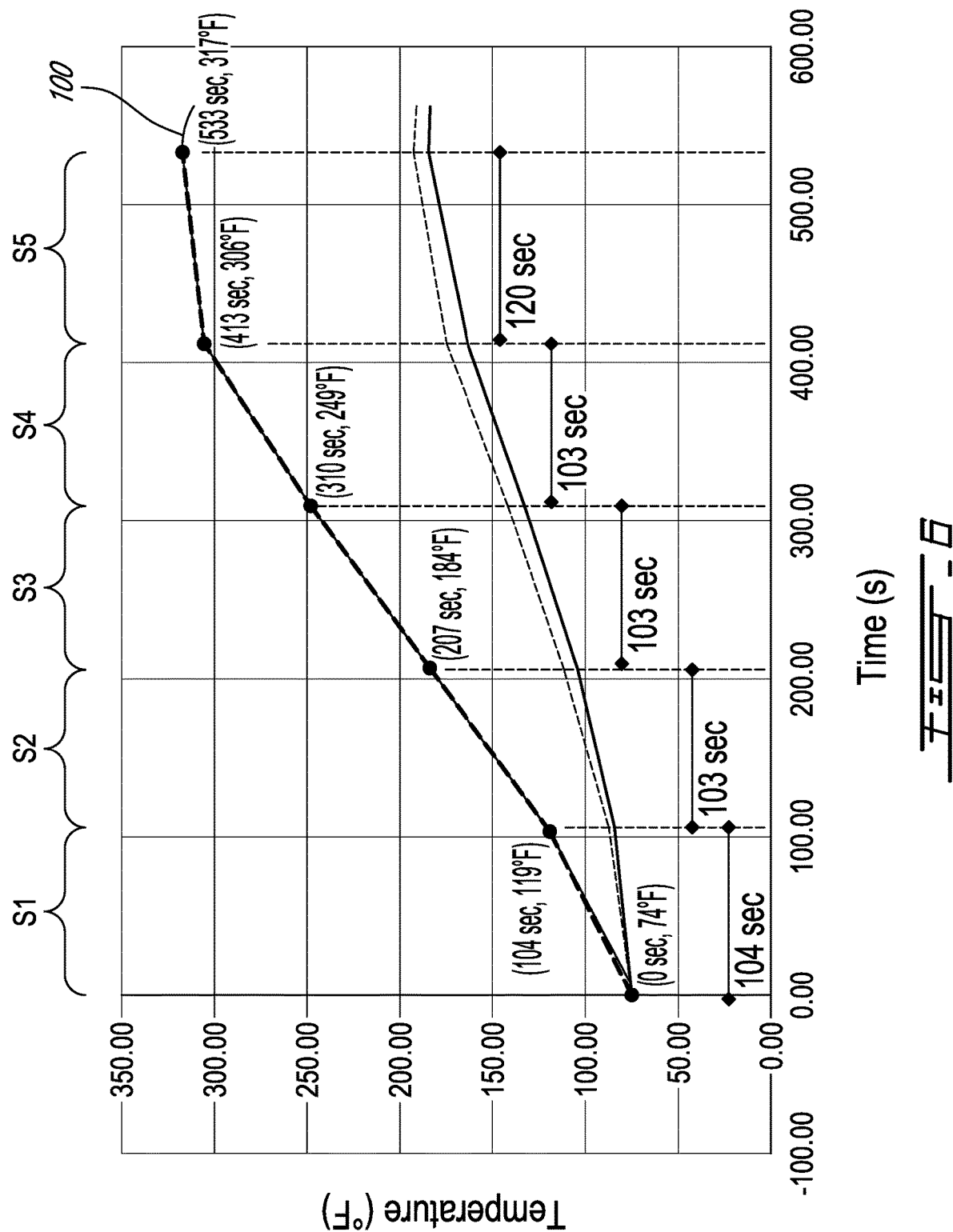
FIG. 6 is a graph showing an example heating recipe.

FIG. 6 presents an example of a heating recipe 100 which breaks down the heating envelope into 5 segments (S1-S5) with associated heating rate setpoints. As presented above, one way of defining the heating rate setpoint is the electrical power, and one way of defining the segments (S1-S5) is in terms of successive time periods. Accordingly, in the example presented in FIG. 6, the heating recipe 100 can be expressed as presented in Table 1, below:

TABLE 1

Example power and time-based recipe

| Segment | Power (kW) | Time (sec) |
|---|---|---|
| S1 | 60 | 104 |
| S2 | 100 | 103 |
| S3 | 130 | 103 |
| S4 | 150 | 103 |
| S5 (Dwell) | 90 | 120 |

In such a heating recipe 100, the power output setting can simply be adjusted by the controller 48 based on a timer 78, and additionally, if a power output sensor is provided, the power output setting can be adapted as a function of the actual power output being sensed by the sensor, for instance.

In another example, the heating recipe 100 presented in FIG. 6 can be expressed as presented in Table 2, below:

TABLE 2

Example target temp and slope-based recipe

| Segment | Segment Target Temp (° F.) | Slope (° F./sec) (ramp) |
|---|---|---|
| S1 | 119 | 0.43 |
| S2 | 184 | 0.63 |
| S3 | 249 | 0.63 |
| S4 | 306 | 0.56 |
| S5 (Dwell) | 317 | 0.09 |

Here, instead of being expressed in terms of electrical power output, the heating rate setpoint can be expressed in terms of a slope, or ramp, expressed in units of temperature/time. For each one of the segments (S1-S5), a control loop can be used to finely adjust the power output based on the heating rate measured based on the variation of the temperature sensor signal over time, to match the heating rate setpoint as closely as possible. In this example embodiment, instead of being defined in terms of successive periods of time, the segments can be defined in terms of absolute temperature values. Accordingly, the heating rate setpoint can switch from 0.43° F./sec to 0.63° F./sec when the sensed temperature reaches 119° F., and so forth, instead of being based on an amount of time elapsed.

It is interesting to note that the heating recipe 100 presented in Table 2 and in Table 1 are the same, and both correspond to the one illustrated in FIG. 6, they differ only in the units in which they are expressed and in terms of control means. In different embodiments, different heating recipes can actually differ in terms of number of segments, max temperature limit, presence, and number of temperature sensors, the way the segments are defined, and the heating rate setpoint of individual ones of the segments, to name some examples, and different ones of the assemblies can be provided with different heating recipes.

Figure 7:
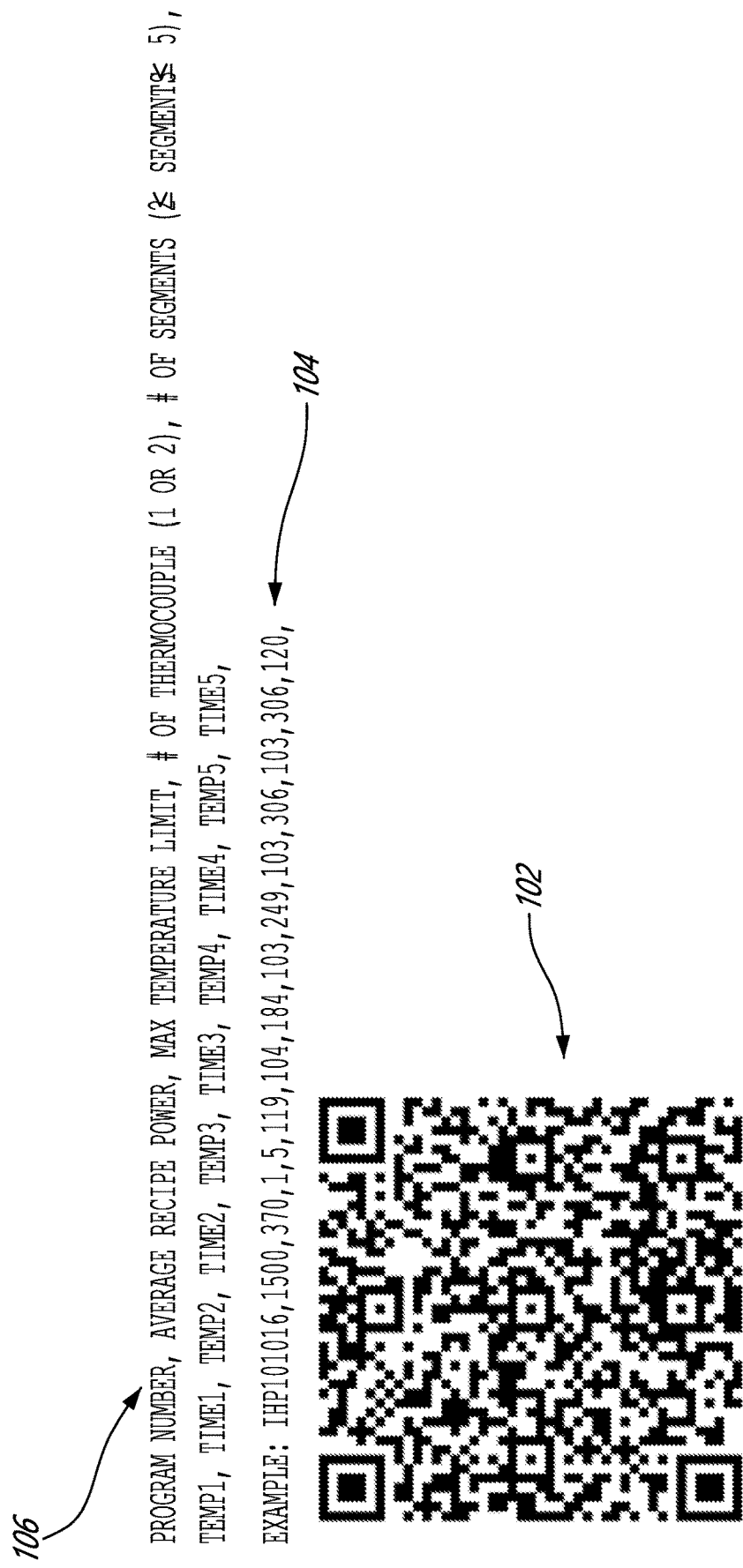
FIG. 7 is an image of an example assembly identifier and an example of the corresponding values and characters which can be supplied.

FIG. 7 represents an example of an embodiment where the assembly identifier is encoded in a 2D code 102. Various values 106, such as assembly identifier, average recipe power, max temperature limit, #of thermocouples, #of segments, temp and time for each segment, can be encoded into a string of characters 104, and the string of characters can be represented in a 2D code 102.

Figure 8:
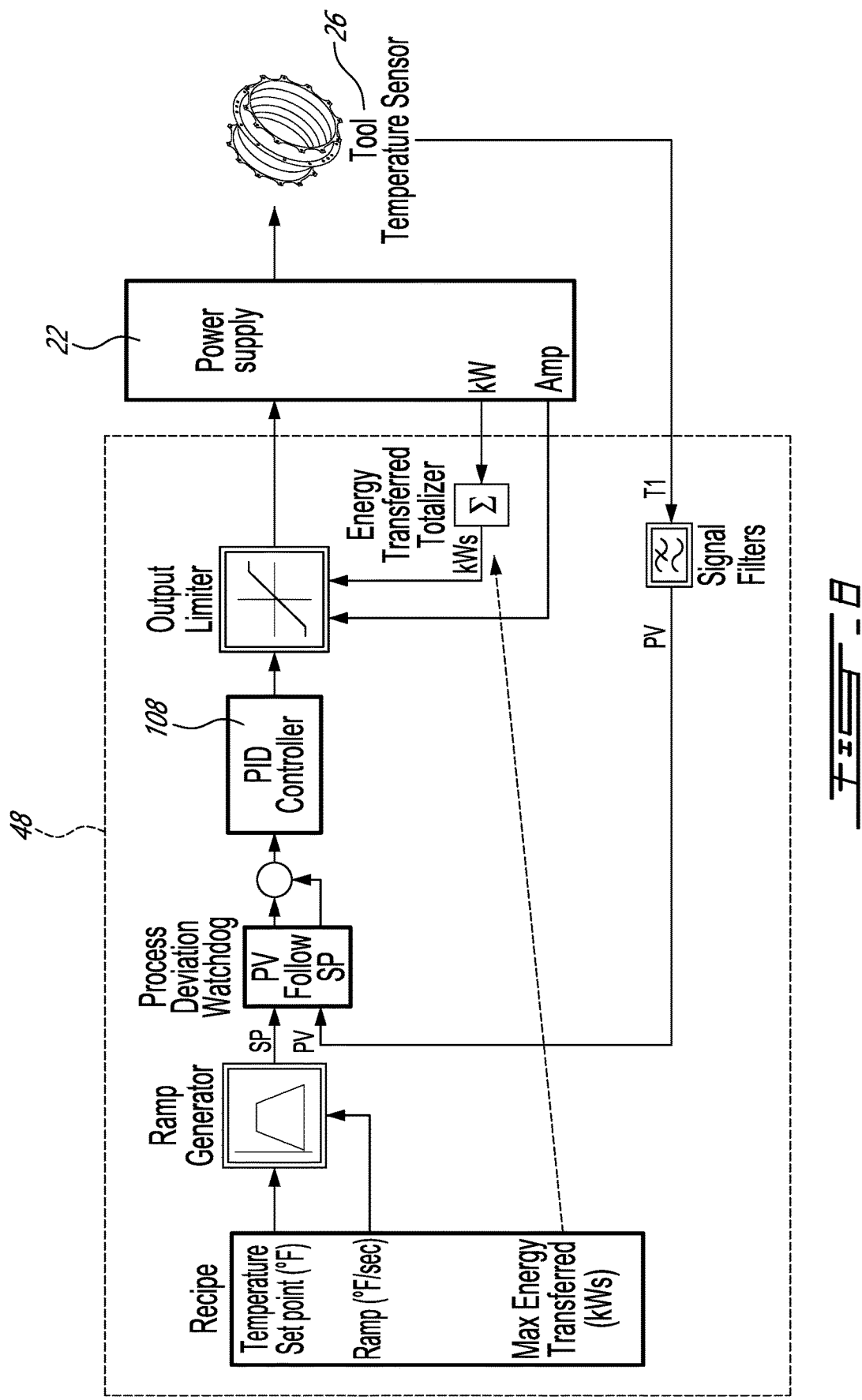
FIG. 8 is a diagram of another example of the induction heating system having a proportional-integral-derivative (PID) controller.

FIG. 8 presents a detailed diagram of an example embodiment where the controller 48 has a PID controller 108 function.

FIG. 9 presents a high level flow chart of an example method 200 of shrink fitting a female part 28 to a male part 27 into one of a plurality of assemblies 30. First, a given one of a plurality of assemblies is received 202 at the induction heating station, where the induction heating system 20 is found. An operator can input an assembly identifier 204 corresponding to a heating recipe for the assembly 30 in question. In some embodiments, a function can be provided to display a visual cue 206 associated to the tooling unit 26 corresponding to the assembly 30 to facilitate its selection by the operator, for instance. The operator can proceed to connect the corresponding tooling unit 26 to the power supply 22, via the power cable 42 for instance, and mount the tooling unit 26 to the female part 28 of the assembly 30, 208, the sequence order of which can depend on what is found most suitable by the operator. The computer 52 knows which heating recipe to use based on the input assembly identifier 210. This can be achieved by integrating the heating recipe into the assembly identifier, or by selecting the heating recipe as a function of the assembly identifier, to name two examples. The computer 52 can then control the amplitude of the electrical power of the power supply 22, 212 in accordance with the heating recipe. In one embodiment, a temperature of the female part 28 is sensed in real time 214, and the temperature signal is sent to the computer 52. The computer 52 can be adapted to further adapt the electrical power setting of the power supply as a function of the measured temperature 216, either in terms of a target rate of temperature increase indicated by the recipe, in terms of interrupting power upon reaching a target temperature, or both. Once the recipe has been completed, the female part 28 will have reached the target temperature. The tooling unit 26 can be dismounted from the female part 28, and the male part 27 can be introduced 218 into the female part 28. When the female part 28 cools down, it will thermally shrink relative to the male part 27 which has not been heated, and reach a state of interference fit with the male part 27, thereby forming the assembly 30, 220.

In some embodiments, female parts 28 can be heated in shrink-fit operations using a faster, more precise and controlled process. A programmable logic controller with its PID logic can control the power output generated by the power supply based on the guidelines from the recipe and on the variable parameters from the environment and the system's components. The logic of the system can also include a maximum temperature at which the system cuts off the power in order to prevent overheating; a flow monitoring feature which interrupts the heating process if cooling liquid is not circulating; a power monitoring feature which interrupts the heating process if too much energy is transferred by the system to the inductor; a deviation alarm feature to check that the inductor/part temperature is closely following the heating rate. The heating process can end after the set temperature has been reached and a certain dwell period of time has elapsed. At this point, the power output can be cut off while the cooling circulation continues. The entry of commands into the programmable logic control (PLC) may be done manually, by introducing a USB flash drive or other methods.

It will be understood that the expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. A processor and/or a memory system can be local, distributed, or virtual.

The expression "non-transitory" is intended to explicitly exclude a signal, and involve data is stored for a certain amount of time, e.g. at least the period of time corresponding to the operation of the process, and in some cases much more, depending on the embodiment.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the system can alternately have an additional heating circuit which would allow to heat 2 different areas on an engine part simultaneously, at different temperature set points and/or heating rates (dual output), or two different engine parts at once. In an alternate embodiment the logic could be altered to allow the heating to be restarted even when the part to heat is hotter than room temperature. This would transmit into a gain of time, eliminating the cool down period. Yet further modifications could be implemented by a person of ordinary skill in the art in view of the present disclosure, which modifications would be within the scope of the present technology.

The invention claimed is:

1. An induction heating system for shrink fitting a plurality of different assemblies, each assembly having a corresponding female part and male part configured for interference fitting within the female part, the system comprising:
 a plurality of tooling units associated to respective ones of the assemblies, each tooling unit including an induction coil configured for induction heating the corresponding female part when in a heating position and supplied with electrical power, and a holder supporting the induction coil, the holder configured for engagement with the corresponding female part in a manner to hold the induction coil in the heating position when engaged;
 a power supply configured for generating the electrical power;
 power cables configured for selectively connecting and disconnecting the power supply to any one of the tooling units; and
 a computer having:
  a processor and non-transitory memory readable by the processor,
  an input device configured for inputting an assembly identifier associated to a respective one of the assemblies into the non-transitory memory, each assembly identifier associating the corresponding assembly to a corresponding heating recipe, the heating recipe including a heating rate setpoint, and a function, stored in the non-transitory memory and executable by the processor, configured to:

receive a temperature signal representing a temperature associated with the assembly identifier, and control an amplitude of the electrical power in accordance with the heating recipe and as a function of the temperature signal.

2. The induction heating system of claim 1, wherein each one of the tooling units further comprises a temperature sensor secured to the holder, the temperature sensor configured for monitoring the temperature associated with the assembly identifier, the temperature associated with the assembly identifier being associated with the corresponding female part, in response to said induction heating when in the heating position, and transmitting the temperature signal to the computer.

3. The induction heating system of claim 2 wherein the heating rate setpoint is a temperature heating rate setpoint.

4. The induction heating system of claim 3 wherein the recipe further includes a maximum temperature setpoint, the computer further has a function of interrupting the electrical power as a function of the maximum temperature setpoint and the signal indicative of temperature.

5. The induction heating system of claim 3 wherein the computer comprises proportional integral derivative (PID) controller adapted to perform the function of adapting the amplitude of the electrical power.

6. The induction heating system of claim 2 wherein the temperature sensor is a thermocouple, further comprising a wire configured for selectively connecting and disconnecting the computer to any one of the tooling units.

7. The induction heating system of claim 1 wherein the heating recipe includes a plurality of segments, and heating rate setpoints for each one of the segments.

8. The induction heating system of claim 7 wherein the segments are defined as successive ranges of temperature of the part.

9. The induction heating system of claim 1 wherein the input device is a scanner configured for reading the assembly identifier from a code associated to the respective assembly.

10. The induction heating system of claim 9 wherein the assembly identifier includes solely a definition of the corresponding heating recipe, the computer comprising a function of storing the heating recipe acquired from the reading into the non-transitory memory, thereby deleting any previously stored heating recipe from the non-transitory memory.

11. The induction heating system of claim 1 wherein the input device is a keypad allowing to enter a code corresponding to the assembly identifier.

12. The induction heating system of claim 11 wherein heating recipes associated to respective ones of the assemblies via a corresponding assembly identifier are stored in the non-transitory memory, the computer comprising a function of selecting one of the heating recipes based on the code entered via the keypad.

13. A computer program product stored in a non-transitory memory and executable by a processor to:

receive an assembly identifier associated to one of a plurality of assemblies, each assembly having a female part and a male part, receive a temperature signal representing a temperature associated with the assembly identifier, and control an amplitude of electrical power delivered to an induction coil located in a heating position relative the corresponding female part, said controlling an amplitude being in accordance with a heating recipe, the heating recipe based on the assembly identifier, a function of the temperature signal, and including a heating rate setpoint.

14. The computer program product of claim 13 further configured to, during said controlling of the amplitude of the electrical power, receive a signal indicative of an instantaneous temperature of the female part, and adapting the amplitude of the electrical power as a function of the signal indicative of the instantaneous temperature.

15. The computer program product of claim 14 wherein the heating rate setpoint is a temperature heating rate setpoint, said adapting including adapting the amplitude of the electrical power based on a comparison between the signal indicative of the instantaneous temperature and the temperature heating rate setpoint.

16. The computer program product of claim 14 wherein the heating recipe further includes a maximum temperature setpoint, further configured to interrupt the electrical power contingent upon the maximum temperature setpoint being reached based on a comparison with the signal indicative of temperature.

17. An induction heating system for shrink fitting a plurality of different assemblies, each assembly having a corresponding female part and male part configured for interference fitting within the female part, the system comprising:

a plurality of tooling units associated to respective ones of the assemblies, each tooling unit including an induction coil configured for induction heating the corresponding female part when in a heating position and supplied with electrical power, and a holder supporting the induction coil, the holder configured for engagement with the corresponding female part in a manner to hold the induction coil in the heating position when engaged;

a power supply configured for generating the electrical power;

power cables configured for selectively connecting and disconnecting the power supply to any one of the tooling units; and a computer having:

a processor and non-transitory memory readable by the processor, an input device configured for inputting an assembly identifier associated to a respective one of the assemblies into the non-transitory memory, each assembly identifier associating the corresponding assembly to a corresponding heating recipe, the heating recipe including a heating rate setpoint, a function, stored in the non-transitory memory and executable by the processor, to control an amplitude of the electrical power in accordance with the heating recipe; and wherein each one of the tooling units further comprises a temperature sensor secured to the holder, the temperature sensor configured for monitoring the temperature of the corresponding female part in response to said induction heating when in the heating position, and transmitting a signal indicative of said temperature to the computer, the function in the computer further configured to adapt the amplitude of the electrical power as a function of the signal indicative of the temperature.

\* \* \* \* \*